United States Patent

Dauth et al.

[11] Patent Number: 5,869,726
[45] Date of Patent: Feb. 9, 1999

[54] PROCESS FOR PREPARING ORGANOSILICON COMPOUNDS CONTAINING (METH)ACRYLOXY GROUPS

[75] Inventors: Jochen Dauth; Bernward Deubzer, both of Burghausen; Petra Gratzl, Tuessling; Josef Wolferseder, Tann, all of Germany

[73] Assignee: Wacker-Chemie GmbH, Germany

[21] Appl. No.: 931,723

[22] Filed: Sep. 16, 1997

[30] Foreign Application Priority Data

Oct. 4, 1996 [DE] Germany .................. 196 41 067.3

[51] Int. Cl.$^6$ .................................. C07F 7/08
[52] U.S. Cl. .................. 556/437; 556/440; 556/445; 528/12; 528/26; 528/30
[58] Field of Search .................. 556/437, 440, 556/445; 528/12, 26, 30

[56] References Cited

U.S. PATENT DOCUMENTS

| | | |
|---|---|---|
| 4,292,434 | 9/1981 | Lindner et al. . |
| 5,113,006 | 5/1992 | Herzig . |
| 5,214,077 | 5/1993 | Herzig et al. . |
| 5,250,647 | 10/1993 | Herzig . |
| 5,446,119 | 8/1995 | Herzig et al. . |
| 5,593,787 | 1/1997 | Dauth et al. . |
| 5,670,685 | 9/1997 | Likibi et al. ............. 556/437 |

FOREIGN PATENT DOCUMENTS

| | | |
|---|---|---|
| 0130731 | 1/1985 | European Pat. Off. . |
| 0110370 | 4/1987 | European Pat. Off. . |
| 0424960 | 5/1991 | European Pat. Off. . |
| 0503668 | 9/1992 | European Pat. Off. . |
| 0508451 | 10/1992 | European Pat. Off. . |
| 298404 | 2/1992 | German Dem. Rep. . |
| 4325359 | 2/1995 | Germany . |
| 4443749 | 6/1996 | Germany . |

OTHER PUBLICATIONS

Derwent Abstract corresponding to DD 298404 AS (#92–235184), 1992.

*Primary Examiner*—Paul F. Shaver
*Attorney, Agent, or Firm*—Brooks & Kushman P.C.

[57] ABSTRACT

A novel process for preparing organosilicon compounds containing (meth)acxyloxy groups is described, in which alkoxylated alk-2-yne 1,4-di(meth)acrylates (1) of the formula

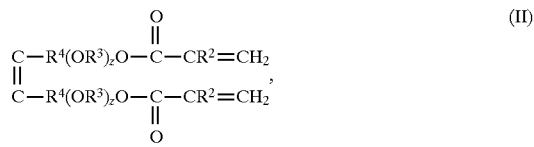

where R$^2$ is a hydrogen atom or a methyl radical, R$^3$ is a linear or branched alkylene radical having from 1 to 6 carbon atoms per radical and R$_4$ is a linear or branched alkylene radical having from 1 to 6 carbon atoms per radical, and z is an integer from 1 to 12, are reacted with organosilicon compounds (2) comprising units of the formula

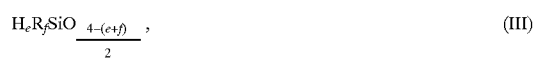

where R is an identical or different monovalent, optionally halogenated hydrocarbon radical having from 1 to 18 carbon atoms per radical, and e is 0 or 1, on average from 0.01 to 1.0, f is 0, 1, 2 or 3, on average from 0.0 to 3.0, and having at least one Si-bonded hydrogen atom per molecule in the presence of catalysts (3) which promote the addition Si-bonded hydrogen onto aliphatic multiple bonds and also in the presence of polymerization inhibitors (4), where alkoxylated alk-2-yne 1,4-di(meth)acrylates (1) are used in amounts of from 1.01 to 1.5 mole per gram atom of Si-bonded hydrogen in organosilicon compound (2).

3 Claims, No Drawings

PROCESS FOR PREPARING ORGANOSILICON COMPOUNDS CONTAINING (METH)ACRYLOXY GROUPS

BRIEF SUMMARY OF THE INVENTION

The present invention relates to a process for preparing organosilicon compounds containing (meth)acryloxy groups.

BACKGROUND OF INVENTION

EP-A 130 731 discloses the reaction of organopolysiloxane having Si-bonded hydrogen with beta(allyloxy)ethyl methacrylate in the presence of a hydrosilylation catalyst. This gives organopolysiloxanes containing meth-acryloxy groups. Organopolysiloxanes containing acryloxy groups are not obtainable selectively by an analogous reaction because the hydrosilylation occurs on both the acryl and allyl radicals.

U.S. Pat. No. 5,214,077 describes the reaction of silanes and organopolysiloxane having Si-bonded hydrogen with alkynyloxy(meth)acrylates in the presence of a hydrosilylation catalyst, where at most one (meth)acryl group is added per Si atom.

DD-A 298 404 describes a process for preparing siloxanylalkenediyl bis(meth)acrylates. An organopolysiloxane containing Si-bonded hydrogen is reacted with an equimolar amount of but-2-yne 1,4-dimethacrylate in the presence of a hydrosilylation catalyst. This reaction uses toxic organic monomers such as but-2-yne 1,4-dimethacrylate and but-2-yne-1,4-diol from which the dimethacrylate is obtained by reaction with methacrylic acid. As a result of the use of equimolar amounts, the SiH group in the organopolysiloxane adds onto both the alkyne and the acrylate group of but-2-yne 1,4dimethacrylate. The relatively nonpolar silicone oils are not readily miscible with commercial photoinitiators.

DE-A 44 43 749 describes a process for preparing alkoxylated siloxanylalkenediyl bis(meth)acrylates in which the siloxanylalkenediyl bis-ω-hydroxypolyoxyalkyls are esterified with methyl acrylate in the presence of tin catalysts. Since the esterification occurs on the polymers, the esterification is not complete and the organosilicon compounds are thermally stressed for a relatively long period of time which leads to partial polymerization of the acrylate groups.

DETAILED DESCRIPTION OF THE INVENTION

It is an object of the present invention to provide a process for preparing organosilicon compounds containing (meth)acryloxy groups in which organosilicon compounds containing (meth)acryloxy groups can be prepared with high selectivity, in high yields and using readily available starting materials which are less toxic than those used previously. A further object is to provide a process for preparing organosilicon compounds containing (meth)acryloxy groups which gives (meth)acryloxy-containing organosilicon compounds which crosslink rapidly under the action of light and in which the photoinitiators used in crosslinking dissolve readily.

The present invention provides a process for preparing organosilicon compounds which contain (meth)acryloxy groups, comprising units of the formula

where
R is an identical or different monovalent, optionally halogenated hydrocarbon radical having from 1 to 18 carbon atoms per radical,
X is an identical or different chlorine atom or a radical of the formula —$OR^1$, where
$R^1$ is an alkyl radical having from 1 to 8 carbon atoms per radical and can be substituted by an ether oxygen atom,
a is 0 or 1,
b is 0, 1, 2 or 3,
c is 0, 1, 2 or 3
and the sum $a+b+c \leq 4$ and preferably the sum $a+b+c \leq 3$
A is a radical of the formula

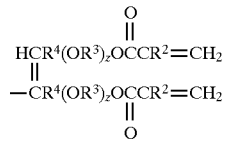

where
z is an integer from 1 to 12,
$R^2$ is a hydrogen atom or a methyl radical,
$R^3$ is a linear or branched alkylene radical having from 1 to 6 carbon atoms per radical and
$R^4$ is a linear or branched alkylene radical having from 1 to 6 carbon atoms per radical,
where at least one radical A is present per molecule, wherein the process comprises reacting alkoxylated alk-2-yne 1,4-di(meth)acrylates (1) of the formula

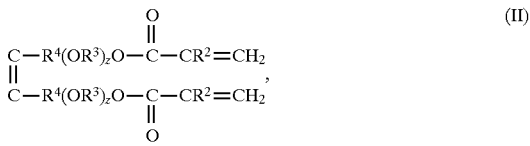

where
$R^2$, $R^3$, $R^4$ and z are as defined for formula (I), with organosilicon compounds (2) comprising units of the formula

where
R is as defined for formula (I),
e is 0 or 1, on average from 0.01 to 1.0,
f is 0, 1, 2 or 3, on average from 0.0 to 3.0, and
the sum e+f is not greater than 4, preferably 3, where the organosilicon compounds of formula (III) contain at least one Si-bonded hydrogen atom per molecule, in the presence of catalysts (3) which promote the addition of Si-bonded
hydrogen onto aliphatic multiple bonds and also in the presence of polymerization inhibitors (4), with the proviso that alkoxylated alk-2-yne 1,4-di(meth)acrylates (1) are used in amounts of from 1.01 to 1.5 mole per gram atom of Si-bonded hydrogen in organosilicon compound (2).

The organosilicon compounds of the invention have an average molecular weight of from 500 to 1,000,000 g/mole, preferably from 5000 to 150,000 g/mole, and have a viscosity of from 10 to 1,000,000 mm².s⁻¹ at 25° C., preferably from 20 to 100,000 mm².s⁻¹ at 25° C., more preferably from 50 to 2000 mm².s⁻¹ at 25° C.

Examples of radicals R are alkyl radicals such as the methyl, ethyl, n-propyl, iso-propyl, 1-n-butyl, 2-n-butyl, iso-butyl, tert-butyl, n-pentyl, iso-pentyl, neo-pentyl and tert-pentyl radicals; hexyl radicals such as the n-hexyl radical; heptyl radicals such as the n-heptyl radical; octyl radicals such as the n-octyl radical and iso-octyl radicals such as the 2,2,4-trimethyl-pentyl radical; nonyl radical such as the n-nonyl radical; decyl radical such as the n-decyl radical; dodecyl radicals such as the n-dodecyl radical; octadecyl radicals, such as the n-octadecyl radical; cycloalkyl radicals such as the cyclopentyl, cyclohexyl and cycloheptyl radicals and methylcyclohexyl radicals; aryl radicals such as the phenyl, naphthyl, anthryl and phenanthryl radicals; alkaryl radicals such as o-, m-, p-tolyl radicals, xylyl radicals and ethylphenyl radicals; and aralkyl radicals such as the benzyl radical, the α- and β-phenyl-ethyl radicals. Preference is given to the methyl radical.

Examples of halogenated radicals R are haloalkyl radicals such as the 3,3,3-trifluoro-n-propyl radical, the 2,2,2,2', 2', 2'-hexafluoroisopropyl radicals and the heptafluoroisopropyl radical, and haloaryl radicals such as the o-, m- and p-chlorophenyl radicals.

Examples of alkyl radicals $R^1$ are methyl, ethyl, n-propyl, iso-propyl, 1-n-butyl, 2-n-butyl, iso-butyl and tert-butyl radicals. Preference is given to the methyl and ethyl radicals. Examples of alkyl radicals $R^1$ which are substituted by an ether oxygen atom are the methoxyethyl and ethoxyethyl radicals.

The radical $R^2$ is preferably a hydrogen atom.

Examples of radicals $R^3$ are alkylene radicals of the formulae —(CH$_2$)$_4$—, —CH$_2$—CH$_2$—, —CH$_2$—CH$_2$—CH$_2$—, —C(CH$_3$)HCH$_2$—. $R^3$ is preferably a radical of the formula —CH$_2$—CH$_2$—.

Examples of alkylene radicals $R^4$ are those of the formulae —CH$_2$—, —CH(CH$_3$)—, —C(CH$_3$)$_2$—, —C(CH$_3$)(C$_2$H$_5$)—, —(CH$_2$)$_2$— and —(CH$_2$)$_4$—, with preference being given to the radical of the formula —CH$_2$—.

z is an integer from 1 to 6, preferably an integer from 2 to 4.

Examples of radicals A are those of the formulae

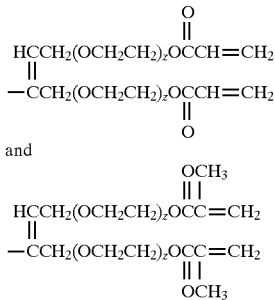

where z is as defined above, preferably an integer from 1 to 6, more preferably from 2 to 4.

The organosilicon compounds obtained in the process of the invention are preferably organopolysiloxanes.

Preferred organopolysiloxanes containing (meth)acryloxy groups are those of the formula $$A_gR_{3-g}SiO(SiR_2O)_n(SiRAO)_mSiR_{3-g}A_g \qquad (IV)$$

where A and R are as defined above, g is 0 or 1, n is 0 or an integer from 1 to 1500 and m is 0 or an integer from 1 to 100, with the proviso that at least one radical A is present per molecule.

The organosilicon compounds of formula (III) used in the process of the invention are preferably organopolysiloxanes.

The organopolysiloxanes of formula (III) containing at least one Si-bonded hydrogen atom per molecule contain at least 0.01% by weight, preferably from 0.02% to 1.6% by weight, of Si-bonded hydrogen, and their average viscosity is from 5 to 20,000 mm².s⁻¹ at 25° C., preferably from 5 to 2000 mm².s⁻¹ at 25° C., more preferably from 5 to 800 mm².s⁻¹ at 25° C.

The organopolysiloxanes containing at least one Si-bonded hydrogen atom per molecule which are used are those of the formula $$H_hR_{3-h}SiO(SiR_2O)_o(SiRHO)_pSiR_{3-h}H_h \qquad (V)$$

where R is as defined above, h is 0 or 1, o is 0 or an integer from 1 to 1500 and p is 0 or an integer from 1 to 100.

In the process of the invention, the alkoxylated alk-2-yne 1,4-di(meth)acrylates (1) are used in excess, preferably from 1.01 to 1.2 mole per gram atom of Si-bonded hydrogen in organosilicon compound (2). The alkoxylated alk-2-yne 1,4-di(meth)acrylates used according to the invention have a significantly lower toxicity and volatility and higher polarity than alk-2-yne 1,4-di(meth)acrylates.

The alkoxylated alk-2-yne 1,4-di(meth)acrylates used in the process of the invention can be prepared by known methods from the prior art. The alkoxylated alkynediol, e.g. the ethoxylated but-2-yne-1,4-diol, is esterified with acrylic acid in the presence of acid catalysts. The water of reaction is removed by azeotropic distillation.

Examples of alkoxylated alk-2-yne 1,4-di(meth)acrylates (1) used in the process of the invention are those of the formulae

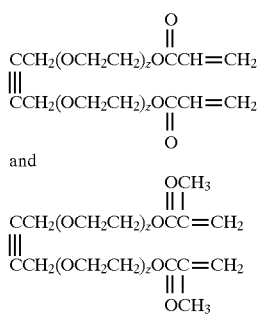

where z is as defined above, preferably an integer from 1 to 6, more preferably from 2 to 4.

The catalysts used in the process of the invention as catalysts (3) which promote the addition of Si-bonded hydrogen onto aliphatic multiple bonds are the same catalysts which have been used for promoting the addition of Si-bonded hydrogen onto aliphatic multiple bonds. The catalyst is preferably a metal of the platinum metal group or a compound or a complex of a platinum group metal. Examples of such catalysts are metallic and finely divided platinum which may be present on supports such as silicon dioxide, aluminum oxide or activated carbon, compounds or complexes of platinum such as platinum halides, e.g. $PtCl_4$, $H_2PtCl_6 \cdot 6H_2O$, $Na_2PtCl_4 \cdot 4 H_2O$, platinum-olefin complexes, platinum-alcohol complexes, platinum-alkoxide complexes, platinum-ether complexes, platinum-aldehyde complexes, platinum-ketone complexes including reaction products of $H_2PtCl_6 \cdot 6H_2O$ and cyclohexanone, platinum-vinylsiloxane complexes such as platinum-1,3-divinyl-1,1,3,3-tetramethyldisiloxane complexes with or without a content of detectable inorganically bonded halogen, bis(gamma-picoline)platinum dichloride, trimethylenedipyridineplatinum dichloride, dicyclopentadieneplatinum dichloride, (dimethyl sulfoxide)ethyleneplatinum(II) dichloride, cyclooctadieneplatinum dichloride, norbornadieneplatinum dichloride, gamma-picolineplatinum dichloride, cyclopentadieneplatinum dichloride and reaction products of platinumtetrachloride with olefin and primary amine or secondary amine or primary and secondary amine as described in U.S. Pat. No. 4,292,434, for example the reaction product of platinum tetrachloride dissolved in 1-octene with sec-butylamine, or ammonium-platinum complexes as described in EP-B 110 370.

In the process of the invention, the catalyst (3) is used in amounts of from 2 to 200 ppm by weight (parts by weight per 1 million parts by weight), preferably in amounts of from 5 to 50 ppm by weight, in each case calculated as elemental platinum and based on the total weight of alkoxylated alkyne diacrylate (1) and organosilicon compound (2).

The polymerization inhibitors (4) used in the process of the invention are preferably phenolic stabilizers such as cresol or hydroquinone derivatives, e.g. bis(tert-butyl) cresole, 2,5-di-tert-butylhydroquinone or the monomethyl ether of hydroquinone or phenothiazine, in a concentration of from 0.001% to 1% by weight, preferably from 0.002% to 0.5% by weight, based on the total weight of alkoxylated alkyne diacrylate (1) and organosilicon compound (2).

The process of the invention is preferably carried out at the pressure of the surrounding atmosphere, i.e at about 1020 hPa (abs.). However, it can also be carried out at higher or lower pressures.

Furthermore, the process of the invention is carried out at a temperature of from 50° C. to 180° C., preferably from 80° C. to 150° C.

In the process of the invention, it is possible to make concomitant use of inert, organic solvents. Examples of inert organic solvents are toluene, xylene, octane isomers and n-butyl acetate.

In the process of the invention, it is possible to make concomitant use of alkali metal and alkaline earth metal salts. Examples are sodium acetate and sodium hydrogen carbonate.

The (meth)acryloxy-containing organopolysiloxanes obtained by the process of the invention can be equilibrated with organopolysiloxanes (5) selected from the group consisting of linear organopolysiloxanes containing terminal triorganosiloxy groups, linear organopolysiloxanes containing terminal hydroxyl groups, cyclic organopolysiloxanes and copolymers comprising diorganosiloxane and monoorganosiloxane units.

As linear organopolysiloxanes containing terminal triorganosiloxy groups, preference is given to using those of the formula $$R_3SiO(SiR_2O)_rSiR_3$$

where R is as defined above and r is 0 or an integer from 1 to 1500; as linear organopolysiloxanes containing terminal hydroxyl groups, use is preferably made of those of the formula $$HO(SiR_2O)_sH$$

where R is as defined above and s is an integer from 1 to 1500; as cyclic organopolysiloxanes, use is preferably made of those of the formula $$(R_2SiO)_t$$

where R is as defined above and t is an integer from 3 to 12; and as copolymers, preference is given to using those comprising units of the formulae $$R_2SiO \text{ and } RSiO_{3/2}$$

where R is as defined above.

The ratios of amounts of organopolysiloxanes used in the equilibration which may be carried out and organopolysiloxanes containing (meth)acryloxy groups are determined purely by the desired proportion of (meth)acryl groups in the organopolysiloxanes produced in the equilibration which may be carried out and by the desired mean chain length.

In the equilibration which may be carried out, preference is given to using acid catalysts which promote the equilibration. Examples of such catalysts are sulfric acid, phosphoric acid, trifluoromethanesulfonic acid, phosphonitrilic chlorides and acid catalysts which are solid under the reaction conditions, e.g. acid-activated bleaching earth, acid zeolites, sulfonated coal and sulfonated styrene-divinylbenzene copolymer. Preference is given to phosphonitrilic chlorides. Phosphonitrilic chlorides are preferably used in amounts of from 5 to 1000 ppm by weight (=parts per million), in particular from 50 to 200 ppm by weight, in each case based on the total weight of the organosilicon compounds used. Although use of basic equilibration catalysts is possible, it is not preferred.

The equilibration which may be carried out is preferably carried out at from 80° C. to 150° C. at the pressure of the surrounding atmosphere, i.e. at about 1020 hPa (abs.). However, optionally, higher or lower pressures can also be used. The equilibration is preferably carried out in from 5% to 80% by weight, based on the total weight of the organosilicon compounds used in each case, of a water-immiscible solvent such as toluene.

Before the work-up of the mixture obtained in the equilibration, the catalyst can be inactivated.

The process of the invention can be carried out batchwise, semi-continuously or fully continuously.

The (meth)acryloxy-containing organosilicon compounds prepared by the process of the invention can be used in compositions which can be cross-linked by irradiation with light and comprise (A) organopolysiloxanes containing (meth)acryloxy groups and (B) photosensitizers.

The compositions which can be crosslinked by irradiation with light can be used for the production of coatings.

The (meth)acryloxy-containing organopolysiloxanes of the invention are preferably crosslinked by ultraviolet light, preferably ultraviolet light having wavelengths in the range from 200 to 400 nm. The ultraviolet light can be produced, for example, in xenon lamps or mercury low-pressure, mercury intermediate-pressure or mercury high-pressure lamps. Also suitable for crosslinking by means of light is the light having a wavelength of from 400 to 600 nm known as "halogen light".

However, the energy sources suitable for crosslinking the organopolysiloxanes of the invention can also include X-rays, gamma rays or electron beams or simultaneous use of at least two different types of such radiation. In addition to high-energy radiation, it is possible to use heating, including heating by means of infrared light. However, such heating is not at all necessary and is preferably omitted in order to reduce energy consumption.

Suitable photosensitizers are substituted or unsubstituted acetophenones, propiophenones, benzophenones, anthraquinones, benzils, carbazoles, xanthones, thioxanthones, fluorenes, fluorenones, benzoins, naphthalenesulfonic acids, benzaldehydes and cinnamic adds.

Examples of such photosensitizers are fluorenone, fluorene, carbazole; acetophenone; substituted acetophenones such as 3-methylacetophenone, 2,2'-dimethoxy-2-phenylacetophenone, 4-methylacetophenone, 3-bromoacetophenone, 4-allylacetophenone, p-diacetylbenzene, p-tertbutyltrichloro-acetophenone; propiophenone; substituted propiophenones such as 1-[4-(methylthio)phenyl]-2-morpholinopropan-1-one, benzophenone; substituted benzophenones such as Michlers ketone, 3-methoxybenzophenone, 4,4'-dimethylaminobenzophenone, 4-methylbenzophenone, 4-chlorobenzophenone, 4,4'-dimethoxybenzophenone, 4-chloro-4'-benzylbenzophenone; xanthone; substituted xanthones such as 3-chloroxanthone, 3,9-dichloroxanthone, 3-chloro-8-nonylxanthone; thioxanthone; substituted thioxanthones such as isopropylthioxanthone; anthraquinone; substituted anthraquinones such as chloroanthraquinone and anthraquinone-1,5-disulfonic acid disodium salt; benzoin; substituted benzoins such as benzoin methyl ether; benzil; 2-naphthalenesulfonyl chloride; benzaldehyde; cinnamic acid.

Photosensitizers are used in amounts of from 0.01% to 10% by weight, in particular from 0.5% to 5% by weight, in each case based on the total weight of the organopolysiloxanes to be crosslinked.

For reasons of better handling, preference is given to admixing the organosilicon compounds of the invention with small amounts of an inhibiting component in order, for example, to prevent premature crosslinking of a ready-to-use formulation during storage. Examples of inhibitors which may be used are all customary inhibitors which have been used previously in free-radical processes, for example hydroquinone, 4-methoxy-phenol, 2,6-di-tert-butyl-4-methylphenol or phenothiazine. Inhibitors are used in amounts of from 10 to 10,000 ppm, preferably from 50 to 600 ppm, in each case based on the total weight of the organosilicon composition of the invention.

Examples of surfaces to which the coatings can be applied are those of paper, wood, cork, plastic films, e.g. polyethylene films or polypropylene films, ceramic articles, glass, including glass fibers, metals, board including that made of asbestos and woven and nonwoven cloth made of natural or synthetic organic fibers. The coatings according to the invention are used, for example, in coating anti-adhesive paper.

The compositions which can be crosslink by irradiation with light can be applied to the surfaces to be coated in any manner suitable and widely known for the production of coatings from liquid materials, for example by dipping, painting, pouring on, spraying, rolling on, printing, e.g. by means of an offset gravure coating apparatus, knife or doctor-blade coating.

The (meth)acryloxy-containing organosilicon compounds prepared by the process of the invention can be used as additives in paints and varnishes, in textile and leather processing and in the electronics industry.

All reaction times in the following examples are based on the complete reaction of SiH groups.

All mole % figures in the following examples are based on reacted SiH groups.

EXAMPLE 1

30.0 g of a hydrogen terminated polydimethylsiloxane having a hydrogen content of 0.027% by weight ($0.8 \times 10^{-2}$ mole of hydrogen) and a viscosity of 171 mm$^2$/s at 25° C., 3.38 g of an ethoxylated butynediol diacrylate having a molecular weight of 400 g/mole ($0.844 \times 10^{-2}$ mole of C≡C), $1.01 \times 10^{-9}$ hydroquinone monomethyl ether (300 ppm based on the weight of diacrylate used), 0.067 g ($0.798 \times 10^{-3}$ mole) of sodium hydrogen carbonate, 13.52 g (0.147 mole) of toluene and 85.56 μl (20 ppm of platinum, based on pure metal) of a solution of hexachloroplatinic acid in isopropanol having a platinum content of 1% by weight are heated to 110° C. in a reaction vessel while stirring. After a reaction time of 20 minutes at 110° C., the reaction mixture is filtered and evaporated to constant weight at 100° C. in a high vacuum. This gives 27.93 g (84% of theory) of a clear, colorless, odorless oil having a viscosity of 450 mm$^2$/s, which displays no SiOC linkage in the $^{29}$Si-NMR and no addition product of SiH onto the acrylate groups in the $^1$H-NMR.

Comparative Example 1 (DD-A 298 404)

30.0 g of a hydrogen terminated polydimethylsiloxane having a hydrogen content of 0.027% by weight ($0.8 \times 10^{-2}$ mole of hydrogen) and a viscosity of 171 mm$^2$/s at 25° C., 1.56 g of butynediol diacrylate ($0.8 \times 10^{-2}$ mole of C≡C), 0.47 mg (300 ppm based on the weight of diacrylate used) of hydroquinone monomethyl ether, 6.25 g (0.678 mole) of toluene and 80.92 μl (20 ppm of platinum, based on pure metal) of a solution of hexachloroplatinic acid in isopropanol having a platinum content of 1% by weight are heated to 110° C. in a reaction vessel while stirring. After a reaction time of 35 minutes at 110° C., the reaction mixture is filtered and evaporated to constant weight at 100° C. in a high vacuum. This gives 25.57 g (81% of theory) of a clear, pale yellow oil having a typical acrylate odor and a viscosity of 241 mm$^2$/s at 25° C., which displays 6.24 mole % of SiOC linkage in the $^{29}$Si-NMR and no addition product of SiH onto the acrylate groups in the $^1$H-NMR.

EXAMPLE 2

9.59 g (0.024 mole of C≡C) of an ethoxylated butynediol diacrylate having a molecular weight of 400 g/mole, $3.84 \times 10^{-3}$ g (400 ppm based on the weight of diacrylate used) of hydroquinone monomethyl ether, $3.9 \times 10^{-2}$ g ($4.8 \times 10^{-4}$ mole) of sodium acetate, 7.0 g (0.076 mole) of toluene and 75.35 μl (30 ppm of platinum, based on pure metal) of a solution of hexachloroplatinic acid in isopropanol having a platinum content of 1% by weight are heated to 110° C. in a reaction vessel while stirring. 10 g of a hydrogen terminated polydimethylsiloxane having a hydrogen content of 0.23% by weight (0.0228 mole of hydrogen) and a viscosity of 7.2 mm$^2$/s at 25° C. are then added dropwise at a rate of 1 gram per minute. After a reaction time of 40 minutes at 110° C., the reaction mixture is filtered and evaporated to constant weight at 100° C. in a high vacuum. This gives 11.5 g (60% of theory) of a clear, pale yellow, odorless oil having a viscosity of 123 mm$^2$/s at 25° C., which displays no SiOC linkage in the $^{29}$Si-NMR and no addition product of SiH onto the acrylate group in the $^1$H-NMR.

Comparative Example 2 (DD-A 298 404)

4.43 g (0.0228 mole) of butynediol diacrylate, 1.33 mg (400 ppm based on the weight of diacrylate used) of hydroquinone monomethyl ether, 3.3 g (0.036 mole) of toluene and 55.5 μl (30 ppm of platinum, based on pure metal) of a solution of hexachloroplatinic add in isopropanol having a platinum content of 1% by weight are heated to 110° C. in a reaction vessel while stirring. 10 g of a hydrogen terminated polydimethysiloxane having a hydrogen content of 0.23% by weight (0.0228 mole of hydrogen) and a viscosity of 7.2 mm²/s at 25° C. are then added dropwise at a rate of one gram per minute. After a reaction time of 40 minutes at 110° C., the reaction mixture is filtered and evaporated to constant weight at 100° C. in a high vacuum. This gives 8.39 g (58% of theory) of a clear, yellow oil having a strong acrylate odor and a viscosity of 26 mm²/s at 25° C., which displays 2.0 mole % of SiOC linkages in the $^{29}$Si-NMR and 3.8 mole % of the addition product of SiH onto the acrylate groups in the $^{1}$H-NMR.

EXAMPLE 3

20.0 g of a hydrogen polydimethylsiloxane having a hydrogen content of 0.057% by weight (0.0113 mole of hydrogen) where the hydrogen is not attached to terminal siloxane groups and a viscosity of 395 mm²/s at 25° C., 4.98 g of an ethoxylated butynediol diacrylate having a molecular weight of 400 g/mole (0.0124 mole of C≡C), 1.49×10⁻³ g of hydroquinone monomethyl ether (300 ppm based on the weight of diacrylate used), 0.05 g (0.61×10⁻³ mole) of sodium acetate, 19.92 g (0.216 mole) of toluene and 96.08 μl (30 ppm of platinum, based on pure metal) of a solution of hexachloroplatinic acid in isopropanol having a platinum content of 1% by weight are heated to 110° C. in a reaction vessel while stirring. After a reaction time of 35 minutes at 110° C., the reaction mixture is filtered and evaporated to constant weight at 100° C. in a high vacuum. This gives 18.16 g (74% of theory) of a clear, colorless, odorless oil having a viscosity of 2130 mm²/s at 25° C., which displays no SiOC linkage in the $^{29}$Si-NMR and no addition product of SiH onto the acrylate group in the $^{1}$H-NMR.

Comparative Example 3 (DD-A 298 404)

20.0 g of a non-terminal, hydrogen-containing polydimethylsiloxane having a hydrogen content of 0.057% by weight (0.0113 mole of hydrogen) and a viscosity of 395 mm²/s at 25° C., 2.19 g (0.0113 mole of C≡C) of butynediol diacrylate, 0.66 mg (300 ppm based on the weight of diacrylate used) of hydroquinone monomethyl ether, 8.76 g (0.095 mole) of toluene and 85.35 μl (30 ppm of platinum, based on pure metal) of a solution of hexachloroplatinic acid in isopropanol having a platinum content of 1% by weight are heated to 110° C. in a reaction vessel while stirring. After a reaction time of 50 minutes at 110° C., the reaction mixture is filtered and evaporated to constant weight at 100° C. in a high vacuum. This gives 15.39 g (69% of theory) of a clear, yellow oil having a typical acrylate odor and a viscosity of 5640 mm²/s at 25° C., which displays 1.8 mole % of SiOC linkages in the $^{29}$Si-NMR and 0.4 mole % of the addition product of SiH onto the acrylate groups in the $^{1}$H-NMR.

EXAMPLE 4

30 g of a silicon resin comprising silicon dioxide and hydrogendimethylsiloxy units and having a hydrogen content of 0.05% by weight (0.0149 mole of hydrogen), 7.16 g (0.0164 mole of C≡C) of an ethoxylated butynediol diacrylate having a molecular weight of 400 g/mole, 1.43×10⁻³ g (200 ppm based on the weight of diacrylate used) of hydroquinone monomethyl ether, 0.07 g (0.833×10⁻³ mole) of sodium hydrogen carbonate, 60 g (0.651 mole) of toluene and 95.28 μl (20 ppm of platinum, based on pure metal) of a solution of hexachloroplatinic acid in isopropanol having a platinum content of 1% by weight are heated to 110° C. in a reaction vessel while stirring. After a reaction time of one hour at 110° C., the reaction mixture is filtered and evaporated to constant weight at 100° C. in a high vacuum. This gives 35.1 g (94.4% of theory) of a white, odorless solid resin.

Compared with DD-A 298 404, the organosilicon compounds prepared by the process of the invention are distinguished, owing to the excess of triple bond equivalents, by few to no SiOC linkages and SiH-acrylate addition products. The process ensures shorter reaction times and thus lower thermal stressing of the acrylate compounds, which contributes to process reliability. The products prepared by the process of the invention are mostly colorless, clear and odorless.

What is claimed is:

1. A process for preparing organosilicon compounds which contain (meth)acryloxy groups, comprising units of the formula

where

R is an identical or different monovalent, optionally halogenated hydrocarbon radical having from 1 to 18 carbon atoms per radical, X is an identical or different chlorine atom or a radical of the formula —OR$^1$, where R$^1$ is an alkyl radical which has from 1 to 8 carbon atoms per radical and can be substituted by an ether oxygen atom, a is 0 or 1, b is 0, 1, 2 or 3, c is 0, 1, 2 or 3 and the sum a+b+c≦4 and

A is a radical of the formula

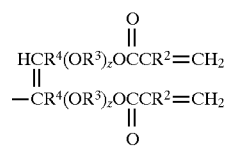

where z is an integer from 1 to 12,

R$^2$ is a hydrogen atom or a methyl radical,

R$^3$ is a linear or branched alkylene radical having from 1 to 6 carbon atoms per radical and R$^4$ is a linear or branched alkylene radical having from 1 to 6 carbon atoms per radical, where at least one radical A is present per molecule, wherein the process comprises reacting alkoxylated alk-2-yne 1,4-di(meth)acrylates (1) of the formula

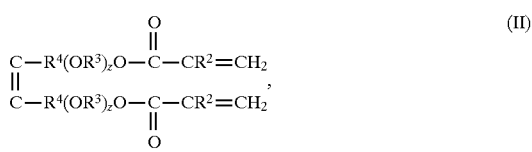

where

R$^2$ is a hydrogen atom or a methyl radical,

R$^3$ is a linear or branched alkylene radical having from 1 to 6 carbon atoms per radical and $R^4$ is a linear or branched alkylene radical having from 1 to 6 carbon atoms per radical, with organosilicon compounds (2) comprising units of the formula $$H_e R_f SiO_{\frac{4-(e+f)}{2}}, \quad (III)$$

where

R is an identical or different monovalent, optionally halogenated hydrocarbon radical having from 1 to 18 carbon atoms per radical, e is 0 or 1, f is 0, 1, 2 or 3, and the sum e+f is not greater than 4, where the organosilicon compounds of formula (III) contain at least one Si-bonded hydrogen atom per molecule, in the presence of catalysts (3) which promote the addition of Si-bonded hydrogen onto aliphatic multiple bonds and also in the presence of polymerization inhibitors (4), with the proviso that alkoxylated alk-2-yne 1,4-di(meth)acrylates (1) are present in amounts of from 1.01 to 1.5 mole per gram atom of Si-bonded hydrogen in organosilicon compound (2).

2. The process as claimed in claim 1, wherein the alkoxylated alk-2-yne 1,4-di(meth)acrylates (1) present are those of the formula

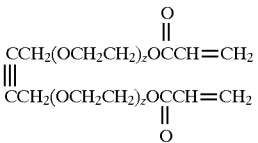

where z is an integer from 1 to 12.

3. The process as claimed in claim 1, wherein the organosilicon compounds (2) used are organopolysiloxanes containing at least one Si-bonded hydrogen atom per molecule of the formula $$H_h R_{3-h} SiO(SiR_2O)_o(SiRHO)_p SiR_{3-h}H_h \quad (V)$$

where

R is an identical or different monovalent, optionally halogenated hydrocarbon radical having from 1 to 18 carbon atoms per radical, h is 0 or 1, o is 0 or an integer from 1 to 1500 and p is 0 or an integer from 1 to 100.

* * * * *

UNITED STATES PATENT AND TRADEMARK OFFICE
CERTIFICATE OF CORRECTION

PATENT NO. : 5,869,726
DATED : February 9, 1999
INVENTOR(S) : Jochen Dauth et al.

It is certified that error appears in the above-identified patent and that said Letters Patent is hereby corrected as shown below:

Column 10, Line 59, Claim 1, delete

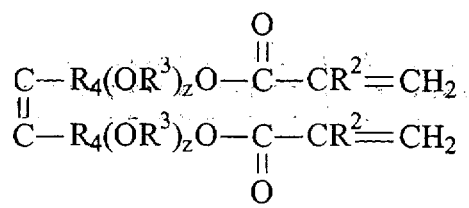

and insert therefor:

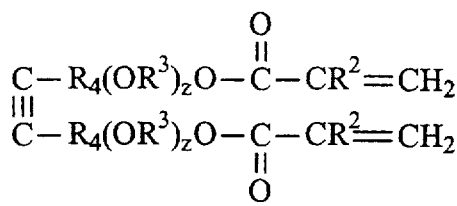

Signed and Sealed this

Twentieth Day of July, 1999

*Attest:*

Q. TODD DICKINSON

*Attesting Officer*     *Acting Commissioner of Patents and Trademarks*